United States Patent [19]

Pipon et al.

[11] Patent Number: 4,850,561
[45] Date of Patent: Jul. 25, 1989

[54] STANDARD MODULE DEVICE FOR AN ADJUSTMENT IN HEIGHT OF BASE OF A SEAT

[75] Inventors: Yves Pipon; Georges Droulon, both of Saint-Georges des Groseillers, France

[73] Assignee: A. & M. Cousin Etablissements Cousin Freres, Flers, France

[21] Appl. No.: 943,809

[22] Filed: Dec. 19, 1986

[30] Foreign Application Priority Data

Dec. 23, 1985 [FR] France ............................ 85 19051

[51] Int. Cl.$^4$ .......................................... B60N 1/06
[52] U.S. Cl. .................................. 248/421; 248/422; 248/394
[58] Field of Search .............. 248/421, 419, 394, 396, 248/422

[56] References Cited

U.S. PATENT DOCUMENTS 4,634,181   1/1987   Pipon ................................ 297/362

FOREIGN PATENT DOCUMENTS

1929412   4/1978   Fed. Rep. of Germany ...... 248/421
2659308   7/1978   Fed. Rep. of Germany ...... 248/421
2070919   9/1981   United Kingdom ................ 248/421

Primary Examiner—Alvin Chin-Shue
Attorney, Agent, or Firm—Browdy and Neimark

[57] ABSTRACT

The device comprises longitudinal adjustment slides for the seat. Each of the slides has a mobile element with an upper face carrying L-shaped supports with vertical wing portions. The vertical wing portion carries at least one mechanism having a control shaft for driving a rocking lever in rotation having a front end which cooperates with an intermediate part rigidly connected to a side portion of a framework of the seat. The rear end of the rocking lever cooperates with a front portion of a second rocking lever which is articulated on the vertical wing portion and has a rear portion which is mounted in a rear portion of the framework of the seat.

9 Claims, 12 Drawing Sheets

STANDARD MODULE DEVICE FOR AN ADJUSTMENT IN HEIGHT OF BASE OF A SEAT

FIELD OF THE INVENTION

Seats of modern vehicles, particularly the front seat thereof, can be adjusted from front to rear, horizontally, in height by a vertical adjustment of the seat base, either from front to rear or from rear to front, or even vertically by lifting the front and the rear portion of the seat.

The same applies to the back of these seats which can be more or less inclined, at the will of the user.

The purpose of all these devices is to avoid as much as possible the fatigue of the driver as well as of the passenger.

BACKGROUND OF THE INVENTION

Concerning, however, adjustment of the seat base trim, adjusting devices proposed so far are rather complex to manufacture and therefore costly since they have all been studied for a well determined adaptation which is either an adjustment of the seat base front portion or an adjustment of the seat base rear portion, or still for a vertical adjustment of both the front and rear portions, as a function of a determined seat and of a determined vehicle.

OBJECTS OF THE INVENTION

The present invention remedies these disadvantages by providing a standard module device enabling various adaptations for the following three solutions:

(a) lifting the front of the seat base (raising and relieving the passenger's thighs), (b) lifting the rear of the seat base (a higher position for passengers of a small height), (c) lifting or lowering the front and rear portions, according to the corpulence of the seat user.

By using standard module devices, whatever the type of seats and vehicles, very high performance products can be obtained and at relatively acceptable prices.

Moreover, these standard module devices enable a manual or motorized control with continuous or 0° discontinuous adjustment members, or with positions defined by a nut system, which is undeniably a substantial improvement of the presently known lifting devices.

SUMMARY OF THE INVENTION

The invention relates more particularly to a standard module device for an adjustment in height or the base of a seat comprising longitudinal adjustment slides for the seat, each of said slides having a mobile element with an upper face carrying L-shaped supports the vertical wing portions of which are used as supports for pivoting points, wherein the vertical wing portion carries at least one mechanism for driving in rotation a rocking lever having a front end which is rigidly connected to a pin and cooperates with a button hole formed in an intermediate part which is rigidly connected to a side portion of a framework of the seat, the rear end of said rocking lever having a button hole through which extends a pin rigidly connected to a front portion of a second rocking lever having a rear portion which is articulated on a fixed pin mounted on said vertical wing portion and a rear portion which holds a pin mounted in a rear portion of the frame work of the seat, a shaft for rotating the mechanism and providing a movement of the rocking lever having one of a manual control means and a reducing gear motor control means.

Various other features of the invention will become more apparent from the following detailed description.

BRIEF DESCRIPTION OF THE DRAWINGS

Embodiments of the invention are shown, by way of non limiting examples, in the accompanying drawings wherein.

DETAILED DESCRIPTION OF THE INVENTION

Figure 1:
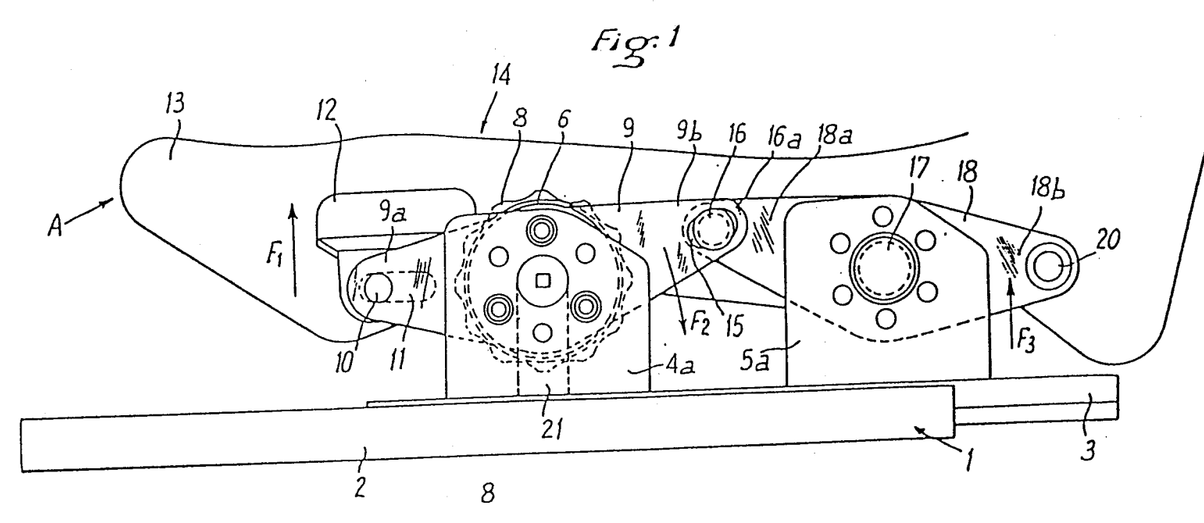
FIG. 1 is a side elevation view of a first embodiment of a standard module device for a height adjustment of the base of a seat (front to rear adjustment)

In FIG. 1, there is shown a slide 1 for the longitudinal adjustment of a seat, the slide 1 being composed of a fixed element 2 and a mobile element 3, the mobile element 3 having an upper face which carries, fixed by any convenient means, two L-shaped supports 4, 5. As better shown in FIG. 2, the vertical wing portions 4a, 5a of the supports 4, 5 are offset in the horizontal plane.

The vertical wing portions 4a of the support 4 carries inside a mechanism 6 for a continuous circular motion of the articulation mechanism of the seat back.

A mechanism 6 is placed on each side of the seat (the seats of the vehicle being fitted with two slides 1) and a shaft 7 for controlling the mechanisms 6 placed on both sides of the seat is driven in the present case by at least one operating knob 8 which can be serrated so as to be easily gripped.

The movable portion of each mechanism 6 permits an angular displacement of a rocking lever 9 centered on the movable portion of the mechanism 6 and which comprises at one end 9a (front end) a pin 10 which can slide in a button hole 11 formed in an intermediate part 12 fixed on a side portion 13 of the framework 14 of a seat.

End 9b of the rocking lever 9 is formed with a button hole 15 in which extends and can move a pin 16 having a head 16a. The pin 16 is fixed at the front end 18a of a second rocking lever 18 mounted on a pin 17 fixed on the vertical wing portion 5a of the support 5. Finally, a rear end 18b of the rocking lever 18 carries a pin 20 extending through a hole formed at rear of the side portion 13 of the seat framework 14.

A vertical support 21 maintains the shaft 7 close to the operating knob 8.

The device as described above operates in the following manner:

The mechanism 6 is provided as an irreversible mechanism, meaning that the toothings for its operation are such that they can only rotate when an imperative effort is exerted on the operating knob 8, the two rocking levers 9 and 18 occupy, therefore, in their normal state, a position as shown in FIG. 1 and the seat is therefore in a determined position.

Should for some reason, a user wishes to lift the seat base, the user operates the knob 8, for example in a clock-wise direction and, therefore, the front portion 9a of the rocking lever 9 tends to pivot about the shaft 7 in direction of arrow $F_1$ (see FIG. 1), this movement being possible since the pin 10 is in the button hole 11. At the same time however, the rear portion 9b of the rocking lever 9 moves in a reverse direction (arrow $F_2$) and due to the button hole 15 it drives the pin 16 which is rigidly connected to the rocking lever 18. The front portion 18a of the rocking lever 18 pivots in direction of arrow $F_2$, and the rear portion 18b of the rocking lever 18 pivots in direction of arrow $F_3$ (see FIG. 1), thereby causing a lifting of the seat rear portion since the framework 14 is rigidly connected to the pins 10 and 20.

Figure 2:
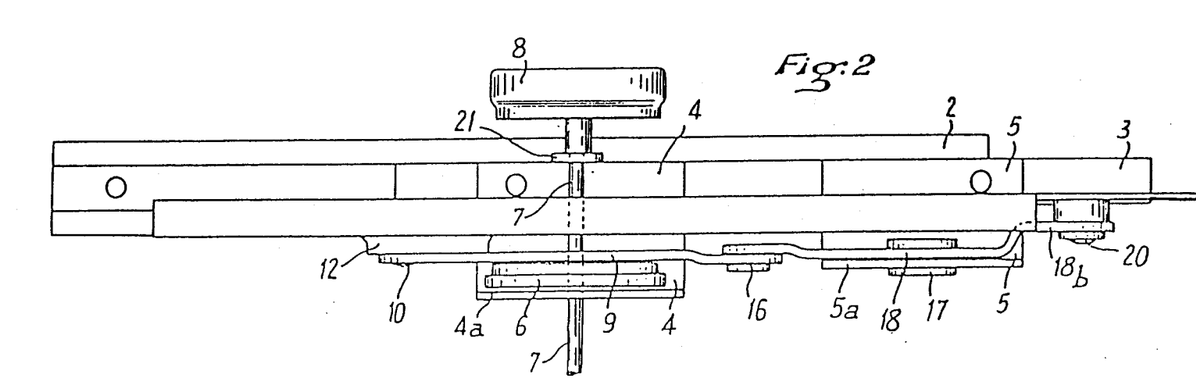
FIG. 2 is a plan view corresponding to FIG. 1.
Figure 3:
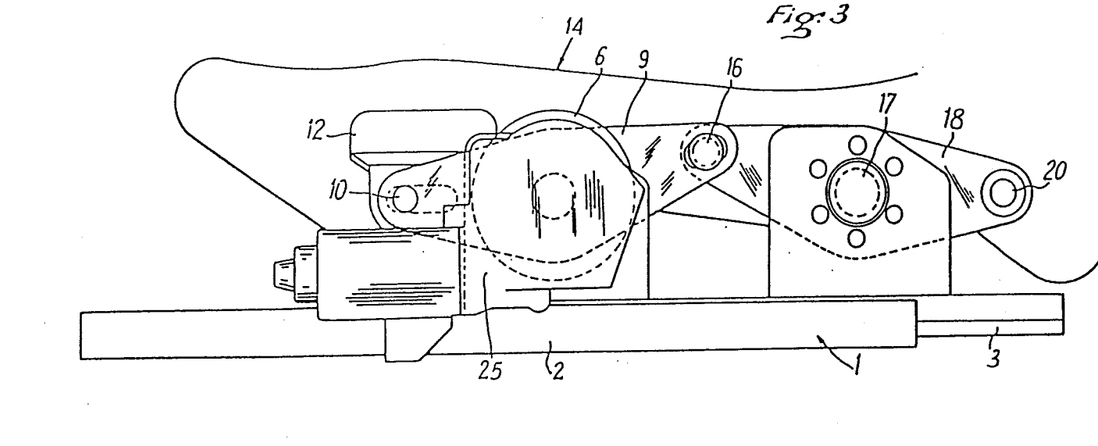
FIG. 3 is a side elevation view corresponding to FIG. 1 but showing a motorized alternative embodiment of the standard module device which can be controlled either by an action on a control knob placed in an accessible position in the passenger space of the vehicle or by an electronic or microprocessor device with a memory.
Figure 4:
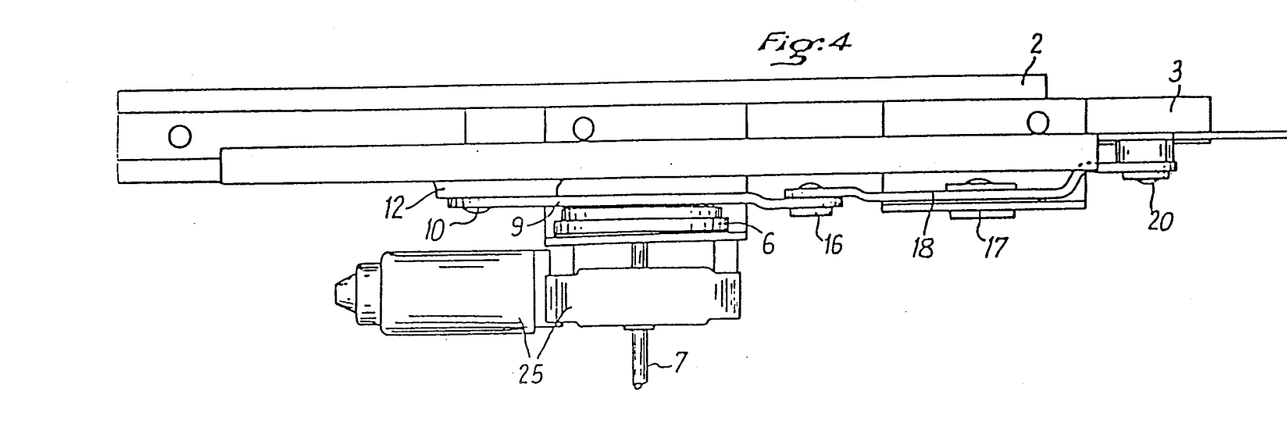
FIG. 4 is a plan view corresponding to FIG. 3.

In FIGS. 3 and 4, the device is substantially the same as in FIGS. 1 and 2, and therefore the reference numerals of the same parts are the same, but the shaft 7 is driven in rotation by a reducing gear motor unit 25, thereby motorizing the lifting system motions which can be controlled either by an action on a control knob placed in an accessible position in the passenger space of the vehicle or by an electronic or microprocessor device with a memory.

Figure 5:
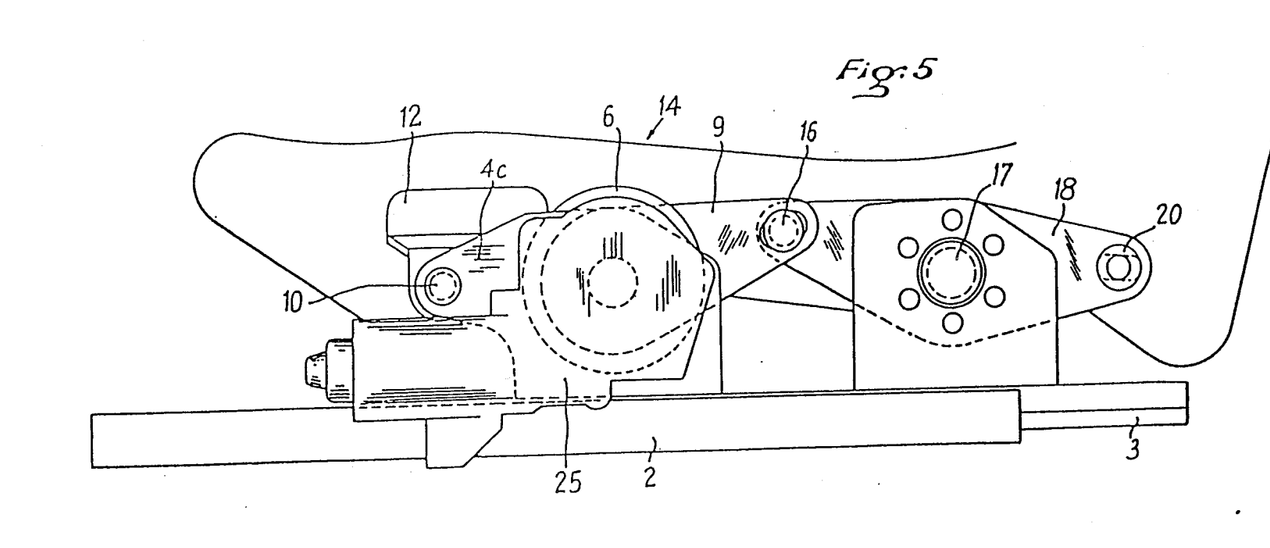
FIG. 5 is a side elevation view of a second embodiment of a motorized standard module device, action of the module concerning only a rear adjustment, the front pivoting point being rigidly connected to a corner iron fixed to the slide of the seat.
Figure 6:
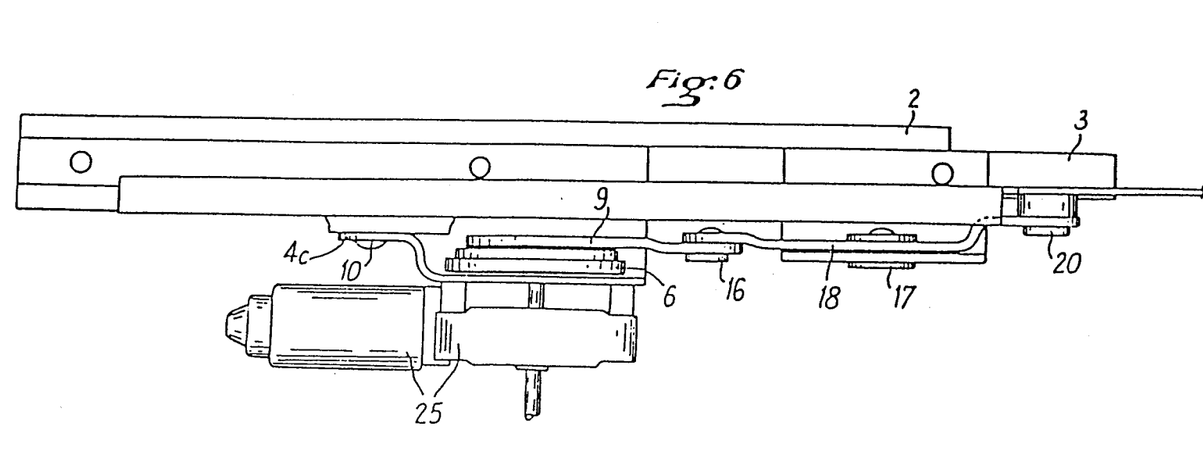
FIG. 6 is a plan view corresponding to FIG. 5.

In FIGS. 5 and 6, the mechanism is substantially the same as in the preceding cases, but the tilting device is reduced only at the rear portion. The corner iron 4 includes a lug 4c connecting, via the pin 10, the fixed portion of the slide to the intermediate part 12 attached to the side portion 13 of the seat framework 14. It should be noted that if this disposition of the module is reversed, tilting of the seat is carried out at the front.

Figure 7:
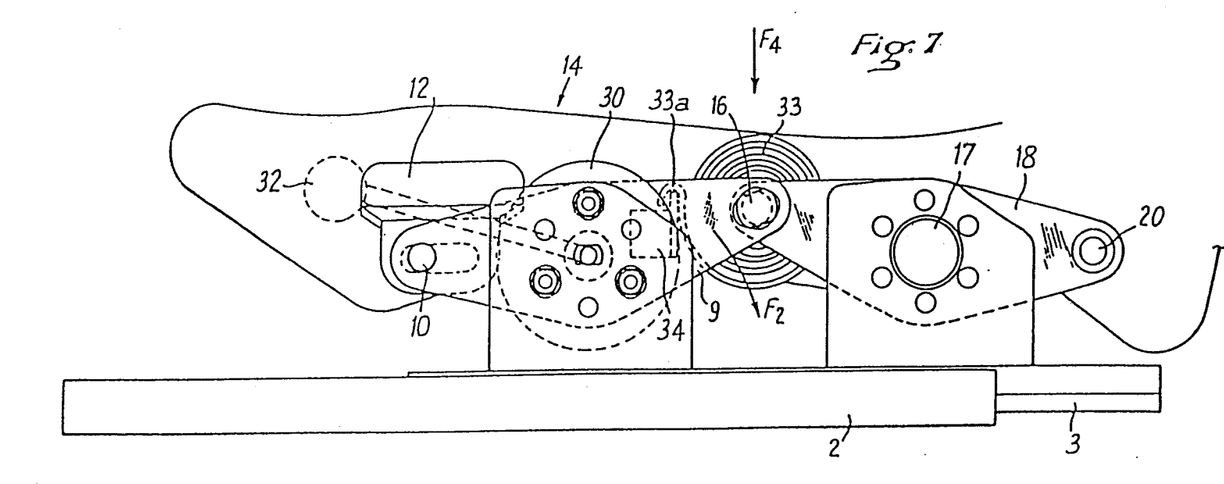
FIG. 7 is a side elevation view of a third embodiment of the manual control standard module device, comprising a 0° discontinuous blocking member or a blocking member having positions defined by a notch system, the lifting motion being aided by a spring.
Figure 8:
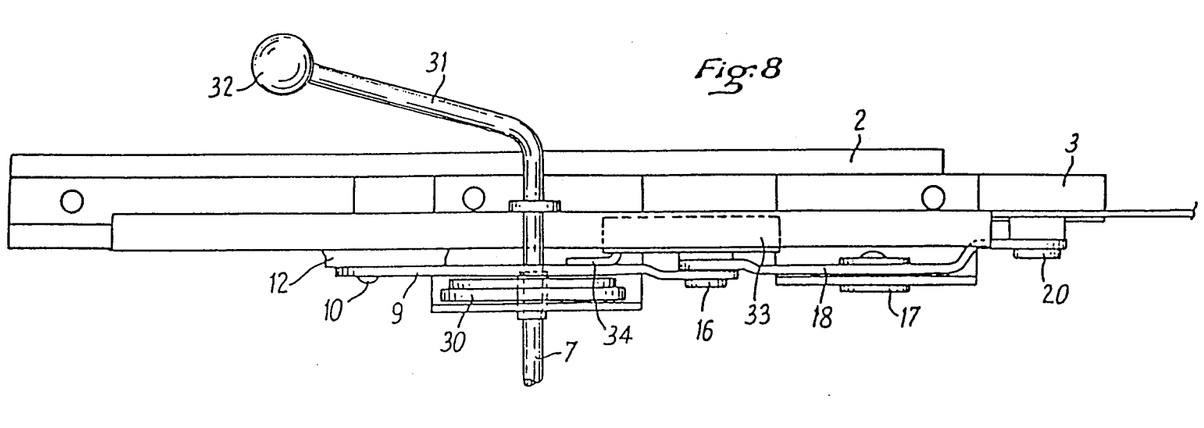
FIG. 8 is a plan view corresponding to FIG. 7.

In FIGS. 7 and 8, the lifting system is substantially made of the same elements as previously, but the driving device 30 which corresponds to the mechanism 6 of FIGS. 1-6 can be either a 0° discontinuous principle module having known blocking members or a discontinuous articulation with an angular blockage by means of a bearing plate, and therefore control of the shaft 7 is effected with the aid of a lever 31 provided with a knob 32.

However, it should be noted that in the case of a driving device 30 made of a 0° discontinuous principle module with manual control or with positions defined by a notch system, it is absolutely necessary to provide at least one, if not two, heavy duty springs 33 concentrical to the pin 16, the free end 33a of which is attached to a lug 34 44 fixed to the rocking lever 9 and which has a tendency to pivot the latter in direction of arrow $F_2$ (see FIG. 7).

Figure 9:
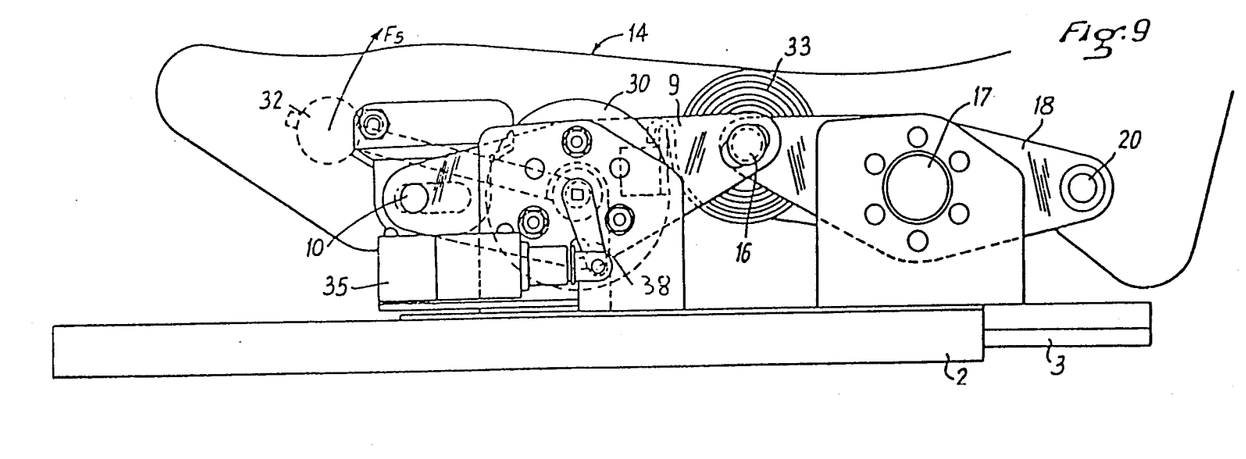
FIG. 9 is an elevation view of a fourth embodiment very similar to that of FIG. 7, the motorized control being obtained by a knob placed on the lever the function of which is to aid a lifting of the system when used by a person widely exceeding the calibrated force of the lifting spring.
Figure 10:
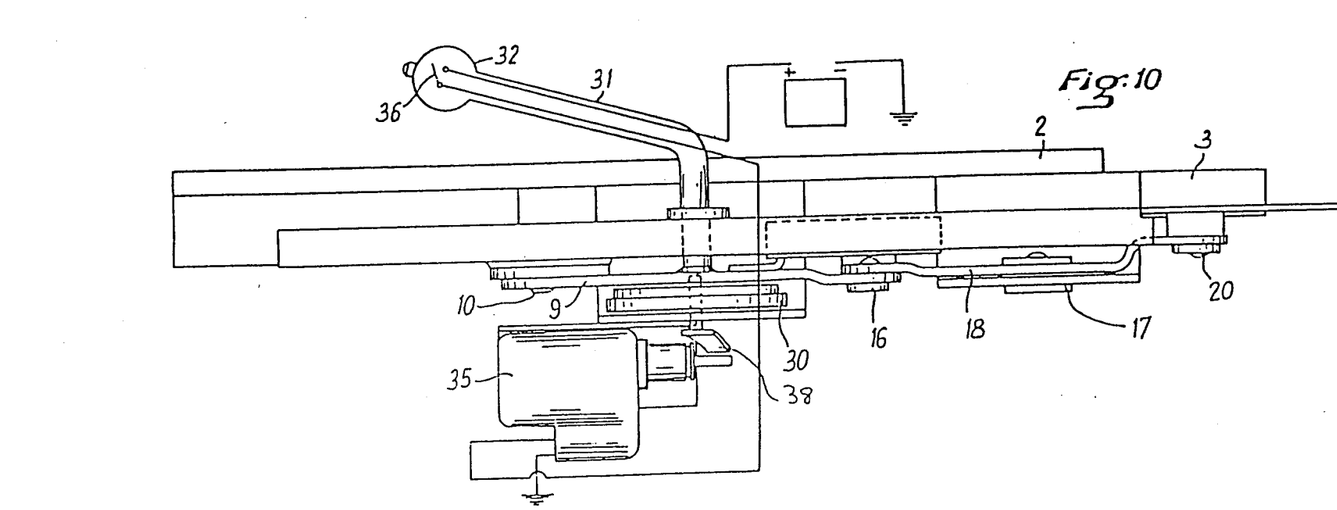
FIG. 10 is a plan view corresponding to FIG. 9.

In FIGS. 9 and 10, the lifting mechanism is substantially identical to that of FIGS. 7 and 8 but the motion of the driving device 30 is controlled by a reducing gear motor unit 35, the electrical feeding circuit of which is under control of a switch 36 placed in the operating knob 32.

Since on the one hand it is possible to control the latching/unlatching motorization by an action, for example, of the thumb on the switch 36 and since the lever 31 is held by the same hand which controls the switch 36, it is easy, with the aid of the lever 31, to facilitate adjustment of the seat trim. For example, if the spring 33 is calibrated to the minimum for a user's weight of 60 kgs, it is possible for the user to lift the seat by using lever 31 in direction of arrow $F_5$ (see FIG. 9) if his weight is widely over 60 kgs and to simultaneously control the blockage of the module when the action on the switch 36 is stopped.

When the user's weight is less than 60 kgs, he will have to exert on the lever 31 a force equivalent to the difference between his own weight and 60 kgs in order to come down, it being understood that when he is seated on the seat, the spring 33 will tend to lift him up to the maximum.

Figure 11:
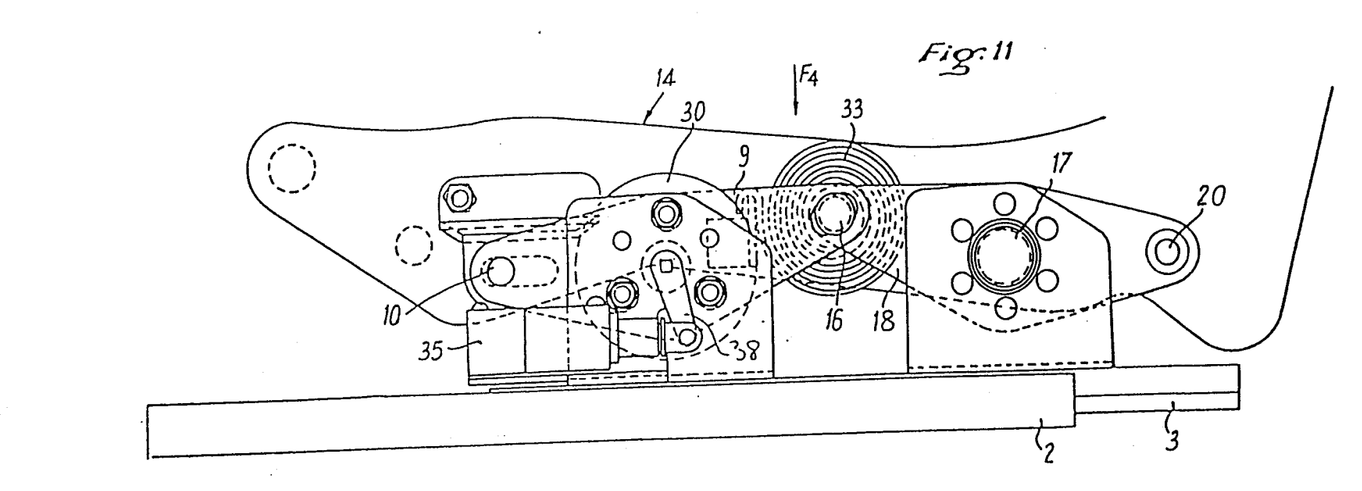
FIG. 11 shows a fifth embodiment of the standard module device with a 0° discontinuous blocking device or a blocking device having positions defined by a motorized notch system the motorization control of which is situated remotely from the height adjustment device.
Figure 12:
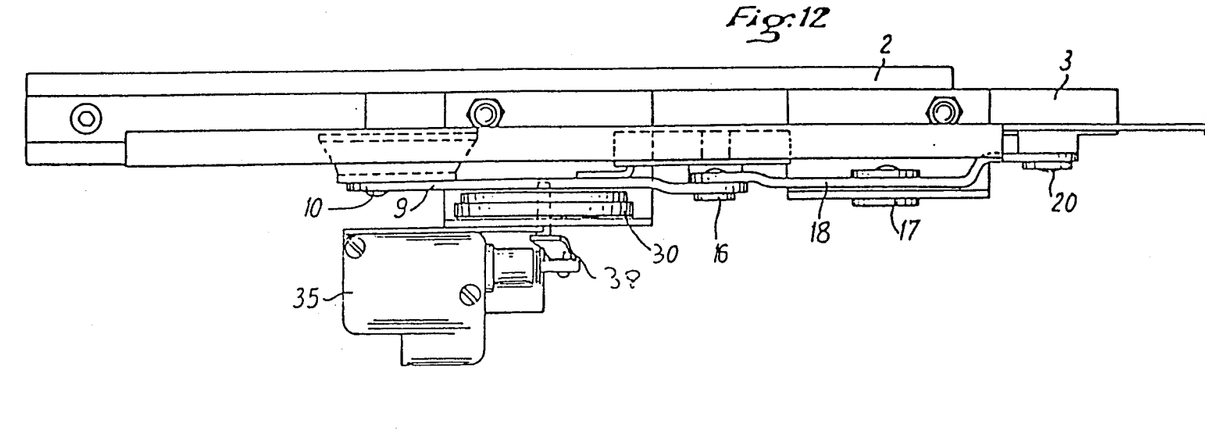
FIG. 12 is a plan view corresponding to FIG. 11.

Finally, FIGS. 11 and 12 show substantially the same device as in case of FIGS. 9 and 10, but the control of the blocking/unblocking of the module 30 is obtained by a motorization 35 controlled by a knob which can be placed anywhere in the vehicle passenger space. With this lifting principle; the spring is widely calibrated for a force equivalent to a weight of 90 kgs, and for lowering the seat a thrust has to be exerted in direction of arrow $F_4$ for reaching the chosen position. When this position is reached, it is enough to release the control knob for blocking the module. It is also possible to use a control electronic circuit incorporating at least one microprocessor.

We claim:

1. A standard module device for an adjustment in height of a base of a seat comprising:

longitudinal adjustment slides for the seat, each of said slides having a mobile element with an upper face carrying at least two L-shaped supports having vertical wing portions which are used as supports for pivoting points;

a unitary rocking lever having a front end which is rigidly connected to a pin and cooperates with a first button hole formed in an intermediate part which is rigidly connected to a side portion of a framework of the seat, a rear end of said rocking lever having a second button hole;

at least one mechanism supported on one of the vertical wing portions for driving in rotation the unitary rocking lever;

a second rocking lever having a pin rigidly connected to a front portion thereof and extending through said second button hole of the rear part of said unitary rocking lever, a central portion which is articulated on a fixed pin mounted on another one of said vertical wing portions, and a rear portion which holds a pin mounted in a rear portion of the framework of the seat;

a shaft for rotating the mechanism providing movement of the unitary rocking lever, said shaft having a control means; and a mechanism for providing a continuous circular motion comprising said mechanism for driving in rotation the rocking lever.

2. A device according to claim 1, wherein said control shaft of said mechanism is driven by a reducing gear motor unit.

3. A device according to claim 1, wherein said mechanism is a continuous mechanism with an irreversible blocking toothing.

4. A device according to claim 1, wherein said mechanism is provided for a continuous circular motion and is a 0° discontinuous principle module having one of a manual and motorized control means.

5. A device according to claim 4, wherein at least one spring, calibrated for a user's minimum weight, facilitates lifting of the seat base.

6. A device according to claim 5, wherein a lever aids the user to move upward or downward, according to whether his weight exceeds or is less than the calibrated force of the of least one lifting spring.

7. A device according to claim 2, wherein the reducing gear motor unit is controlled by a switch placed on said lever for adjustment of the lifting system.

8. A device according to claim 1, wherein the standard module device includes an electronic means with a memory and/or a microprocessor.

9. A device according to claim 1, wherein said control means is a manual control means.

* * * * *